US012306646B1

United States Patent
Asuka

(10) Patent No.: US 12,306,646 B1
(45) Date of Patent: May 20, 2025

(54) METHOD OF ESTIMATING TEMPERATURE OF CONTENT IN ELECTRIC POT AND DEVICE THEREOF

(71) Applicant: Bellnix Co., Ltd., Saitama (JP)

(72) Inventor: Masato Asuka, Saitama (JP)

(73) Assignee: Bellnix Co., Ltd.

( * ) Notice: Subject to any disclaimer, the term of this patent is extended or adjusted under 35 U.S.C. 154(b) by 0 days.

(21) Appl. No.: 18/931,036

(22) Filed: Oct. 30, 2024

Related U.S. Application Data

(63) Continuation of application No. PCT/JP2023/044876, filed on Dec. 14, 2023.

(30) Foreign Application Priority Data

Dec. 6, 2023 (JP) ................................. 2023-205963

(51) Int. Cl.
*H05B 1/02* (2006.01)
*G05D 23/19* (2006.01)

(52) U.S. Cl.
CPC ....... *G05D 23/1917* (2013.01); *H05B 1/0269* (2013.01)

(58) Field of Classification Search
CPC .. H05B 1/0269; H05B 3/0004; H05B 3/0023; H05B 3/68; H05B 3/681; H05B 3/683; A47J 27/21; A47J 27/21008; A47J 27/21041; A47J 27/2105; A47J 27/21066;

(Continued)

(56) References Cited

U.S. PATENT DOCUMENTS

| 2007/0221668 | A1 | 9/2007 | Baarman et al. |
| 2021/0106171 | A1* | 4/2021 | Tietz ........................ A47J 36/32 |
| 2022/0210874 | A1 | 6/2022 | Kikuchi |

FOREIGN PATENT DOCUMENTS

| CN | 102985799 A | * | 3/2013 | ............ A47J 36/321 |
| CN | 111358294 A | * | 7/2020 | .......... A47J 27/2105 |
| JP | H03-191925 A | | 8/1991 | |

(Continued)

OTHER PUBLICATIONS

International Search Report for PCT/JP2023/044876 dated Jan. 23, 2024.
PCT written opinion dated Jan. 23, 2024.

*Primary Examiner* — Hung D Nguyen
(74) *Attorney, Agent, or Firm* — Yokoi & Co., U.S.A.; Toshiyuki Yokot

(57) ABSTRACT

A device for heating a content by a heater incorporated in the device while receiving an electricity by a power reception coil provided with an electric pot from a power supply coil provided with a power feeding stand in a non-contact manner, the device further including: a power supply circuit configured to supply the electricity to the heater; a temperature sensor configured to detect the temperature of the heater; a controller for controlling an energization to the heater; a temperature storage unit for storing the temperature detected by the temperature sensor via the controller; a temperature estimation coefficient storage unit configured to store a temperature estimation coefficient Ce preliminarily and peculiarly set to the electric pot; and a temperature estimation unit configured to estimate the temperature of the content based on a data stored in the temperature storage unit and the temperature estimation coefficient Ce.

7 Claims, 7 Drawing Sheets

(58) Field of Classification Search
CPC ............ A47J 27/21075; A47J 27/21083; A47J 27/21091; A47J 27/21166
See application file for complete search history.

(56) References Cited

FOREIGN PATENT DOCUMENTS

| | | | | |
|---|---|---|---|---|
| JP | 2001-046229 | A | | 2/2001 |
| JP | 2008-295637 | A | | 12/2008 |
| JP | 5132718 | B | | 1/2013 |
| JP | 2020-010434 | A | | 1/2020 |
| KR | 2023-0103354 | A | * | 7/2023 |
| WO | WO-2008155538 | A2 | * | 12/2008 .......... A47J 27/2105 |

* cited by examiner

METHOD OF ESTIMATING TEMPERATURE OF CONTENT IN ELECTRIC POT AND DEVICE THEREOF

CROSS-REFERENCE TO RELATED APPLICATIONS

This Application claims the benefit of priority and is a Continuation application of the prior International Patent Application No. PCT/JP2023/044876, with an international filing date of Dec. 14, 2023, which designated the United States, and is related to the Japanese Patent Application No. 2023-205963, filed Dec. 6, 2023, the entire disclosures of all applications are expressly incorporated by reference in their entirety herein.

TECHNICAL FIELD

The present invention related to a method of estimating a heating temperature of a content in an electric pot accurately based on a temperature sensor incorporated in the electric pot and a device thereof.

BACKGROUND OF THE INVENTION

Conventionally, an electric pot shown in FIG. 7 is known (Patent Document 1). In FIG. 7, an annular heater 52 is provided on an outer bottom part of a container 51 as a heating means. A thermosensitive element (thermistor) 53 is attached to a center part of the annular heater 52 so as to be pressed against the container 51. The temperature of the water in the container 51 is indirectly detected by a temperature detection means 54 including the thermosensitive element 53 as a part of the temperature detection means 54. When the heater 52 is energized to start the heating operation, a temperature gradient detection means 55 detects a temperature gradient from the output of the temperature detection means 54 and the value of the temperature gradient is stored in a first storage means 56 under a predetermined condition.

Then, a gradient comparison means 57 compares the value stored in the first storage means 56 with the output of the temperature gradient detection means 55 and outputs the result when the ratio between the value and the output becomes a predetermined ratio or less.

On the other hand, a temperature comparison means 58 compares an output of the temperature detection means 54 with the value stored in a nonvolatile second storage means 59 and outputs the result when the output of the temperature detection means 54 becomes the stored value or more. When one of the output of the gradient comparison means 57 and the output of the temperature comparison means 58 is obtained, a boiling detection means 60 detects the boiling and the energization to the heater 52 is stopped. Thus, the output of the temperature detection means 54 at that time is stored in the second storage means 59.

PRIOR ART

Patent Documents

[Patent Document 1] Japanese Unexamined Patent Application Publication No. H3-191925

SUMMARY OF THE INVENTION

Problem to be Solved by the Invention

The invention described in Patent Document 1 aims for providing an electric pot for detecting the boiling. Since the annular heater 52 is provided on the outer bottom part of the container 51 as a heating means and the thermosensitive element (thermistor) 53 is attached to the center part of the annular heater 52 so as to be pressed against the container 51, the detected temperature is the temperature of the outer bottom part of the container 51. Since the actual temperature characteristic of the water in the container 51 varies depending on the thermal resistance of the container, the material of the container, the heat retaining performance of the container, the capacity of the container and the like, the actual temperature of the water should be indirectly detected by the temperature detection means 54.

When the heater 52 is energized to start the heating, the temperature gradient detection means 55 detects the temperature gradient from the output of the temperature detection means 54. Thus, it takes a lot of time to detect the actual temperature of the water and it is impossible to detect the temperature quickly.

The present invention aims for providing an estimation method and an estimation device capable of quickly and precisely estimating the momentarily changing heated temperature of water and other contents stored in the electric pot.

Means for Solving the Problems

A device of estimating a temperature of a content in an electric pot of the present invention is a device for heating a content 36 by a heater 18 provided with an electric pot 28, the device including a power feeding stand 27 incorporating a power supply coil 13; the electric pot 28 incorporating a power reception coil 14 configured to receive an electricity from the power supply coil 13 in a non-contact manner; a power supply circuit 19 configured to supply the electricity to the heater 18; a temperature sensor 22 configured to detect the temperature of the heater 18; a controller 20 connected to the power supply circuit 19 for controlling an energization to the heater 18; a temperature storage unit 25 connected to the controller 20 for storing the temperature detected by the temperature sensor 22 via the controller 20; a temperature estimation coefficient storage unit 29 configured to store a temperature estimation coefficient Ce preliminarily and peculiarly set to the electric pot 28; and a temperature estimation unit 26 configured to estimate the temperature of the content 36 based on a data stored in the temperature storage unit 25 and the temperature estimation coefficient Ce.

The temperature estimation coefficient Ce is determined by the following formula: $Ce=(To1-Tn1)/(To1-Te1)$, the temperature To1 is the temperature at the time T21 and the temperature Tn1 is the temperature at the time T31, the temperature To1 and the temperature Tn1 are measured by controlling the power supply circuit 19 in accordance with an instruction from the controller 20 to apply a pulse voltage to the heater 18 by repeatedly turning on the power supply circuit 19 between the time T11 and the time T21 and turning off the power supply circuit 19 between the time T21 and the time T31, the temperature To1 and the temperature Tn1 are stored in the temperature storage unit 25, and the temperature Te1 is the actually measured temperature of the content 36 preliminarily measured by another temperature sensor different from the temperature sensor 22 at the time T31.

The temperature Te which is an estimated temperature of the content 36 is determined by the following formula: $Te=To-(To-Tn)/Ce$, the temperature To and the temperature Tn are measured by controlling the power supply circuit 19 in accordance with an instruction from the controller 20 to apply a pulse voltage to the heater 18 by repeatedly turning on the power supply circuit 19 between the time T1 and the time T2 and turning off the power supply circuit 19 between the time T2 and the time T3, and the temperature To and the temperature Tn are stored in the temperature storage unit 25.

The temperature estimation unit 26 including: a first subtraction circuit 30 configured to subtract the temperature Tn from the temperature To which are outputted from the temperature storage unit 25; a division circuit 31 configured to obtain (To−Tn)/Ce by dividing (To−Tn) which is outputted from the first subtraction circuit 30 by the temperature estimation coefficient Ce; and a second subtraction circuit 32 configured to obtain the estimated temperature Te=To−(To−Tn)/Ce of the content 36 by subtracting (To−Tn)/Ce outputted from the division circuit 31 from the temperature To outputted from the temperature storage unit 25.

The device further including: a gyro sensor 21 provided in an appropriately rotation center position of the electric pot 28 for outputting a rotation angle and a rotation direction of the electric pot 28, the gyro sensor 21 is connected to the controller 20, the temperature determined by an output of the gyro sensor 21 is stored in a temperature setting unit 24, and the controller 20 is configured to control the electricity supplied from the power supply circuit 19 so that the temperature of the content 36 is matched with the temperature stored in the temperature setting unit 24.

The device further including: a gyro sensor provided in an appropriately rotation center position of the electric pot 28 for outputting a rotation angle and a rotation direction of the electric pot 28, the gyro sensor 21 is connected to the controller 20, the temperature determined by an output of the gyro sensor 21 is stored in a temperature setting unit 24, the controller 20 is configured to control the electricity supplied by the power supply circuit 19 so that the temperature of the content 36 is matched with the temperature stored in the temperature setting unit 24, a vibration motor 43 is provided inside the electric pot 28, the vibration motor 43 is connected to the controller 20, and when the temperature determined by the output of the gyro sensor 21 and stored in the temperature setting unit 24 reaches a predetermined value, the vibration motor 43 is driven by a signal of the controller 20 to vibrate the electric pot 28 for notification.

A method for estimating a temperature of a content in an electric pot of the present invention is for heating a content 36 by a heater 18 provided with an electric pot 28 using a device including: a power feeding stand 27 incorporating a power supply coil 13; the electric pot 27 incorporating a power reception coil 14 configured to receive an electricity from the power supply coil 13 in a non-contact manner; a power supply circuit 19 configured to supply the electricity to the heater 18; a temperature sensor 22 configured to detect the temperature of the heater 18; a controller 20 connected to the power supply circuit 19 for controlling an energization to the heater 18; a temperature storage unit 25 connected to the controller 20 for storing the temperature detected by the temperature sensor 22 via the controller 20; a temperature estimation coefficient storage unit 29 configured to store a temperature estimation coefficient Ce preliminarily and peculiarly set to the electric pot 28; and a temperature estimation unit 26 configured to estimate the temperature of the content 36 based on a data stored in the temperature storage unit 25 and the temperature estimation coefficient Ce, the method including: a step of controlling the power supply circuit 19 in accordance with an instruction from the controller 20 to apply a pulse voltage to the heater 18 by repeatedly turning on the power supply circuit 19 between the time T11 and the time T21 and turning off the power supply circuit 19 between the time T21 and the time T31; a step of determining the temperature To1 at the time T21 and the temperature Tn1 at the time T31 by the temperature sensor 22; a step of determining the actually measured temperature Te1 of the content 36 preliminarily measured by another temperature sensor different from the temperature sensor 22 at the time T31; a step of determining the temperature estimation coefficient Ce peculiarly set to the electric pot 28 by the following formula: Ce=(To1−Tn1)/(To1−Te1); a step of controlling the power supply circuit 19 in accordance with the instruction from the controller 20 to apply a pulse voltage to the heater 18 by repeatedly turning on the power supply circuit 19 between the time T1 and the time T2 and turning off the power supply circuit 19 between the time T2 and the time T3; a step of storing the temperature To at the time T2 and the temperature Tn at the time T3 measured by the temperature sensor 22 in the temperature storage unit 25; and a step of determining the temperature Te of the content 36 based on the preliminarily set temperature estimation coefficient Ce, the temperature To and the temperature Tn by the following formula: Te=To−(To−Tn)/Ce.

Effects of the Invention

In one aspect of the present invention, in the device for heating the content by the heater provided with the electric pot, the device including: a power feeding stand incorporating a power supply coil; an electric pot incorporating a power reception coil configured to receive an electricity from the power supply coil in a non-contact manner; a power supply circuit configured to supply the electricity to the heater; a temperature sensor configured to detect the temperature of the heater; a controller connected to the power supply circuit for controlling an energization to the heater; a temperature storage unit connected to the controller for storing the temperature detected by the temperature sensor via the controller; a temperature estimation coefficient storage unit configured to store a temperature estimation coefficient Ce preliminarily and peculiarly set to the electric pot; and a temperature estimation unit configured to estimate the temperature of the content based on a data stored in the temperature storage unit and the temperature estimation coefficient Ce. Thus, a temperature estimation coefficient Ce is preliminarily and peculiarly set and to the electric pot and registered without using a temperature sensor directly measuring the temperature of the content. Consequently, the temperature of the content can be precisely and quickly estimated from the measurement value of the temperature sensor measuring the temperature of the heater.

In one aspect of the present invention, the temperature estimation coefficient Ce is determined by the following formula: Ce=(To1−Tn1)/(To1−Te1), the temperature To1 is the temperature at the time T21 and the temperature Tn1 is the temperature at the time T31, the temperature To1 and the temperature Tn1 are measured by controlling the power supply circuit in accordance with an instruction from the controller to apply a pulse voltage to the heater by repeatedly turning on the power supply circuit between the time T11 and the time T21 and turning off the power supply circuit between the time T21 and the time T31, the temperature To1 and the temperature Tn1 are stored in the temperature storage unit, and the temperature Te1 is the actually measured temperature of the content preliminarily measured by another temperature sensor different from the temperature sensor at the time T31. Thus, the temperature estimation coefficient Ce peculiarly set to the electric pot can be easily determined.

In one aspect of the present invention, the temperature Te which is an estimated temperature of the content is determined by the following formula: Te=To−(To−Tn)/Ce, the temperature To and the temperature Tn are measured by controlling the power supply circuit in accordance with an instruction from the controller to apply a pulse voltage to the heater by repeatedly turning on the power supply circuit between the time T1 and the time T2 and turning off the power supply circuit between the time T2 and the time T3, and the temperature To and the temperature Tn are stored in the temperature storage unit. Thus, the estimated temperature of the content can be easily and accurately determined.

In one aspect of the present invention, the temperature estimation unit including: a first subtraction circuit configured to subtract the temperature Tn from the temperature To which are outputted from the temperature storage unit; a division circuit configured to obtain (To−Tn)/Ce by dividing (To−Tn) which is outputted from the first subtraction circuit by the temperature estimation coefficient Ce; and a second subtraction circuit configured to obtain the estimated temperature Te=To−(To−Tn)/Ce of the content by subtracting (To−Tn)/Ce outputted from the division circuit from the temperature To outputted from the temperature storage unit. Thus, the temperature estimation unit can be formed by simple subtraction circuit and division circuit.

In one aspect of the present invention, the device further including: a gyro sensor provided in an appropriately rotation center position of the electric pot for outputting a rotation angle and a rotation direction of the electric pot, the gyro sensor is connected to the controller, the temperature determined by an output of the gyro sensor is stored in a temperature setting unit, and the controller is configured to control the electricity supplied from the power supply circuit so that the temperature of the content is matched with the temperature stored in the temperature setting unit. Thus, the temperature can be set by the rotation angle and the rotation direction of the electric pot.

In one aspect of the present invention, the device further including: a gyro sensor provided in an appropriately rotation center position of the electric pot for outputting a rotation angle and a rotation direction of the electric pot, the gyro sensor is connected to the controller, the temperature determined by an output of the gyro sensor is stored in a temperature setting unit, the controller is configured to control the electricity supplied by the power supply circuit so that the temperature of the content is matched with the temperature stored in the temperature setting unit, a vibration motor is provided inside the electric pot, the vibration motor is connected to the controller, and when the temperature determined by the output of the gyro sensor reaches a predetermined value, the vibration motor is driven by a signal of the controller to vibrate the electric pot for notification. Thus, the temperature setting can be felt by touching.

In one aspect of the present invention, a device including: a power feeding stand incorporating a power supply coil; an electric pot incorporating a power reception coil configured to receive an electricity from the power supply coil in a non-contact manner; a power supply circuit configured to supply the electricity to the heater; a temperature sensor configured to detect the temperature of the heater; a controller connected to the power supply circuit for controlling an energization to the heater; a temperature storage unit connected to the controller for storing the temperature detected by the temperature sensor via the controller; a temperature estimation coefficient storage unit configured to store a temperature estimation coefficient Ce preliminarily and peculiarly set to the electric pot; and a temperature estimation unit configured to estimate the temperature of the content based on a data stored in the temperature storage unit and the temperature estimation coefficient Ce is used and the method including: a step of controlling the power supply circuit in accordance with an instruction from the controller to apply a pulse voltage to the heater by repeatedly turning on the power supply circuit between the time T11 and the time T21 and turning off the power supply circuit between the time T21 and the time T31; a step of determining the temperature To1 at the time T21 and the temperature Tn1 at the time T31 by the temperature sensor; a step of determining the actually measured temperature Te1 of the content preliminarily measured by another temperature sensor different from the temperature sensor at the time T31; a step of determining the temperature estimation coefficient Ce peculiarly set to the electric pot by the following formula: Ce=(To1−Tn1)/(To1−Te1); a step of controlling the power supply circuit in accordance with the instruction from the controller to apply a pulse voltage to the heater by repeatedly turning on the power supply circuit between the time T1 and the time T2 and turning off the power supply circuit between the time T2 and the time T3; a step of storing the temperature To at the time T2 and the temperature Tn at the time T3 measured by the temperature sensor in the temperature storage unit; and a step of determining the temperature Te of the content based on the preliminarily set temperature estimation coefficient Ce, the temperature To and the temperature Tn by the following formula: Te=To−(To−Tn)/Ce. Thus, the temperature of the content can be estimated in accordance with the property peculiar to the electric pot.

DETAILED DESCRIPTION OF THE INVENTION

Figure 1:
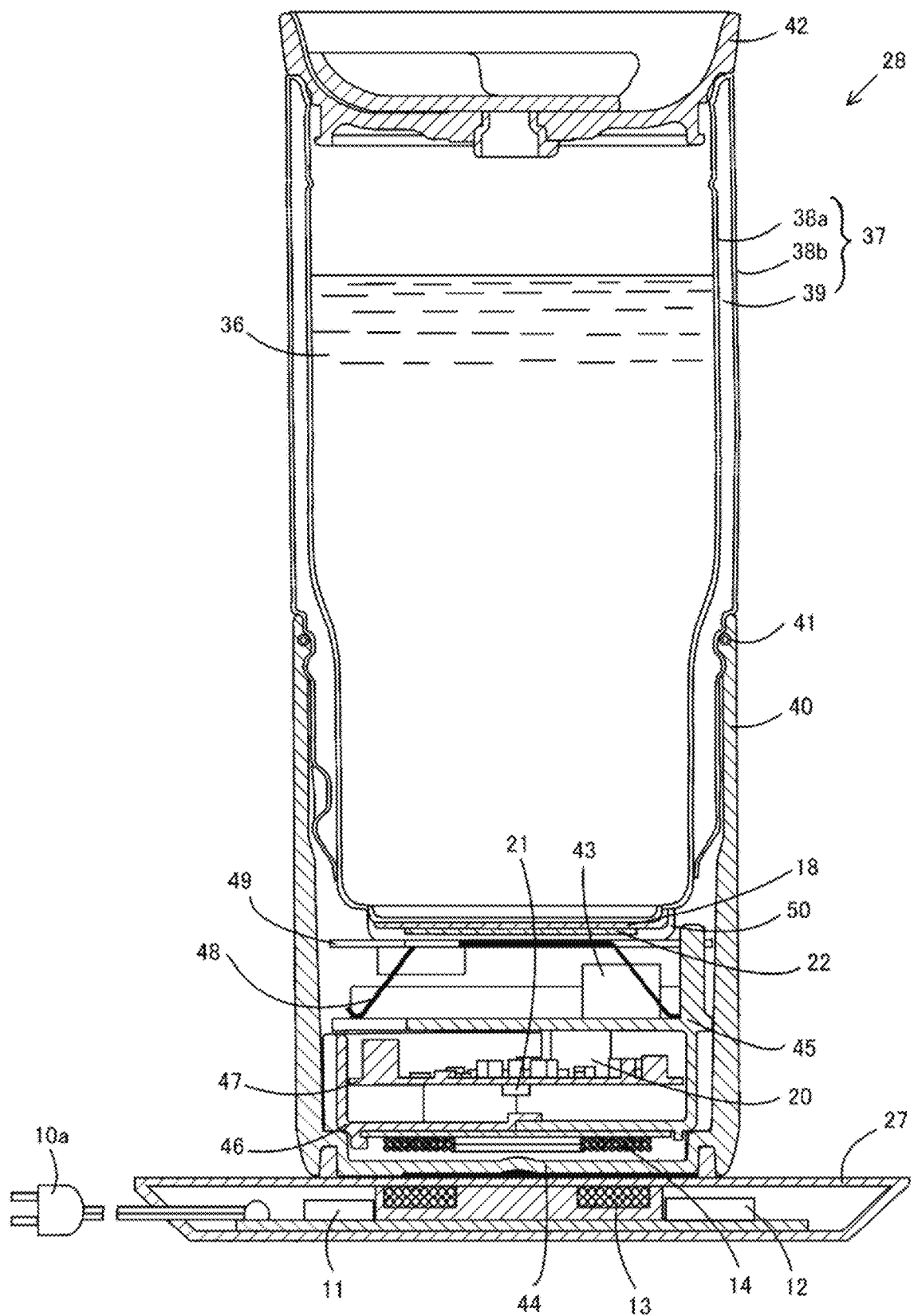
FIG. 1 is a cross-sectional view showing the embodiment 1 of a method and a device for estimating a temperature of a content in an electric pot of the present invention.

A device of estimating a temperature of a content in an electric pot of the present invention is a device for heating a content 36 by a heater 18 provided with an electric pot 28, the device including a power feeding stand 27 incorporating a power supply coil 13; the electric pot 28 incorporating a power reception coil 14 configured to receive an electricity from the power supply coil 13 in a non-contact manner; a power supply circuit 19 configured to supply the electricity to the heater 18; a temperature sensor 22 configured to detect the temperature of the heater 18; a controller 20 connected to the power supply circuit 19 for controlling an energization to the heater 18; a temperature storage unit 25 connected to the controller 20 for storing the temperature detected by the temperature sensor 22 via the controller 20; a temperature estimation coefficient storage unit 29 configured to store a temperature estimation coefficient Ce preliminarily and peculiarly set to the electric pot 28; and a temperature estimation unit 26 configured to estimate the temperature of the content 36 based on a data stored in the temperature storage unit 25 and the temperature estimation coefficient Ce.

The temperature estimation coefficient Ce is determined by the following formula: Ce=(To1−Tn1)/(To1−Te1), the temperature To1 is the temperature at the time T21 and the temperature Tn1 is the temperature at the time T31, the temperature To1 and the temperature Tn1 are measured by controlling the power supply circuit 19 in accordance with an instruction from the controller 20 to apply a pulse voltage to the heater 18 by repeatedly turning on the power supply circuit 19 between the time T11 and the time T21 and turning off the power supply circuit 19 between the time T21 and the time T31, the temperature To1 and the temperature Tn1 are stored in the temperature storage unit 25, and the temperature Te1 is the actually measured temperature of the content 36 preliminarily measured by another temperature sensor different from the temperature sensor 22 at the time T31.

The temperature Te which is an estimated temperature of the content 36 is determined by the following formula: Te=To−(To−Tn)/Ce, the temperature To and the temperature Tn are measured by controlling the power supply circuit 19 in accordance with an instruction from the controller 20 to apply a pulse voltage to the heater 18 by repeatedly turning on the power supply circuit 19 between the time T1 and the time T2 and turning off the power supply circuit 19 between the time T2 and the time T3, and the temperature To and the temperature Tn are stored in the temperature storage unit 25.

The temperature estimation unit 26 including: a first subtraction circuit 30 configured to subtract the temperature Tn from the temperature To which are outputted from the temperature storage unit 25; a division circuit 31 configured to obtain (To−Tn)/Ce by dividing (To−Tn) which is outputted from the first subtraction circuit 30 by the temperature estimation coefficient Ce; and a second subtraction circuit 32 configured to obtain the estimated temperature Te=To−(To−Tn)/Ce of the content 36 by subtracting (To−Tn)/Ce outputted from the division circuit 31 from the temperature To outputted from the temperature storage unit 25.

The device further including: a gyro sensor 21 provided in an appropriately rotation center position of the electric pot 28 for outputting a rotation angle and a rotation direction of the electric pot 28, the gyro sensor 21 is connected to the controller 20, the temperature determined by an output of the gyro sensor 21 is stored in a temperature setting unit 24, and the controller 20 is configured to control the electricity supplied from the power supply circuit 19 so that the temperature of the content 36 is matched with the temperature stored in the temperature setting unit 24.

The device further including: a gyro sensor provided in an appropriately rotation center position of the electric pot 28 for outputting a rotation angle and a rotation direction of the electric pot 28, the gyro sensor 21 is connected to the controller 20, the temperature determined by an output of the gyro sensor 21 is stored in a temperature setting unit 24, the controller 20 is configured to control the electricity supplied by the power supply circuit 19 so that the temperature of the content 36 is matched with the temperature stored in the temperature setting unit 24, a vibration motor 43 is provided inside the electric pot 28, the vibration motor 43 is connected to the controller 20, and when the temperature determined by the output of the gyro sensor 21 and stored in the temperature setting unit 24 reaches a predetermined value, the vibration motor 43 is driven by a signal of the controller 20 to vibrate the electric pot 28 for notification.

A method for estimating a temperature of a content in an electric pot of the present invention is for heating a content 36 by a heater 18 provided with an electric pot 28 using a device including: a power feeding stand 27 incorporating a power supply coil 13; the electric pot 27 incorporating a power reception coil 14 configured to receive an electricity from the power supply coil 13 in a non-contact manner; a power supply circuit 19 configured to supply the electricity to the heater 18; a temperature sensor 22 configured to detect the temperature of the heater 18; a controller 20 connected to the power supply circuit 19 for controlling an energization to the heater 18; a temperature storage unit 25 connected to the controller 20 for storing the temperature detected by the temperature sensor 22 via the controller 20; a temperature estimation coefficient storage unit 29 configured to store a temperature estimation coefficient Ce preliminarily and peculiarly set to the electric pot 28; and a temperature estimation unit 26 configured to estimate the temperature of the content 36 based on a data stored in the temperature storage unit 25 and the temperature estimation coefficient Ce, the method including: a step of controlling the power supply circuit 19 in accordance with an instruction from the controller 20 to apply a pulse voltage to the heater 18 by repeatedly turning on the power supply circuit 19 between the time T11 and the time T21 and turning off the power supply circuit 19 between the time T21 and the time T31; a step of determining the temperature To1 at the time T21 and the temperature Tn1 at the time T31 by the temperature sensor 22; a step of determining the actually measured temperature Te1 of the content 36 preliminarily measured by another temperature sensor different from the temperature sensor 22 at the time T31; a step of determining the temperature estimation coefficient Ce peculiarly set to the electric pot 28 by the following formula: Ce=(To1−Tn1)/(To1−Te1); a step of controlling the power supply circuit 19 in accordance with the instruction from the controller 20 to apply a pulse voltage to the heater 18 by repeatedly turning on the power supply circuit 19 between the time T1 and the time T2 and turning off the power supply circuit 19 between the time T2 and the time T3; a step of storing the temperature To at the time T2 and the temperature Tn at the time T3 measured by the temperature sensor 22 in the temperature storage unit 25; and a step of determining the temperature Te of the content 36 based on the preliminarily set temperature estimation coefficient Ce, the temperature To and the temperature Tn by the following formula: Te=To−(To−Tn)/Ce.

Embodiment 1

Hereafter, the embodiment 1 of the present invention will be explained with reference to FIG. 1 to FIG. 6.

In FIG. 1, the method and the device for estimating a temperature of a content in an electric pot of the present invention is composed of a power feeding stand 27 and an electric pot 28 placed on the power feeding stand 27. A power supply coil 13 incorporated in the power feeding stand 27 and a power reception coil 14 incorporated in the electric pot 28 are magnetically coupled to each other. Thus, electricity (electric power) is transmitted by the effect of electromagnetic induction and magnetic field resonance of a resonance capacitor.

Figure 2:
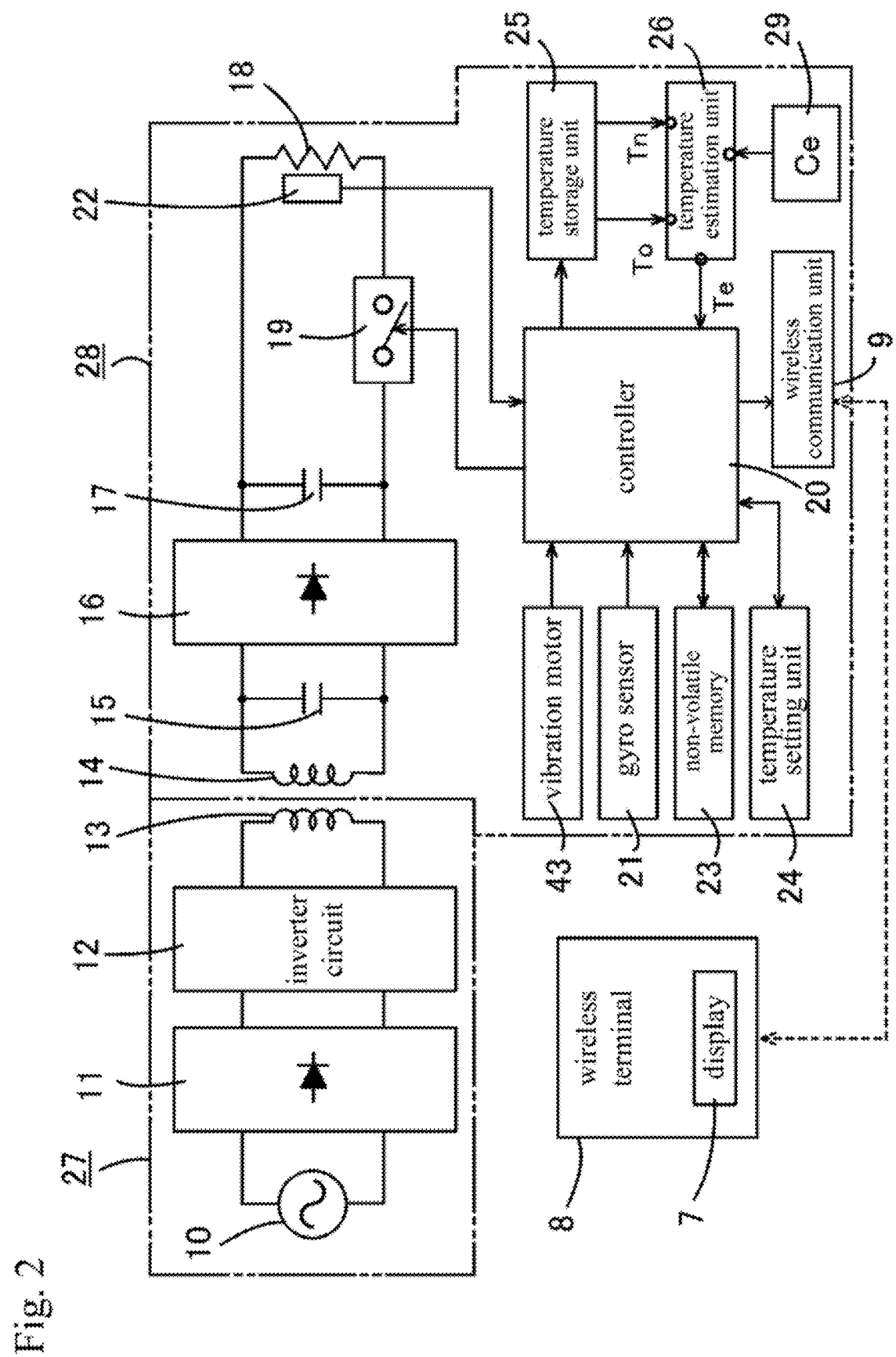
FIG. 2 is an electronic circuit diagram showing the embodiment 1 of the method and the device for estimating the temperature of the content in the electric pot of the present invention.

The thickness of the power feeding stand 27 is approximately 10 to 15 mm (thin) and the diameter of the power feeding stand 27 is approximately 100 to 200 mm. Inside the power feeding stand 27, an AC adapter 10a connected to an AC (alternating current) power source 10, a rectifier circuit 11, an inverter circuit 12 for converting the electricity into a high frequency signal, and a power supply coil 13 as shown in FIG. 2. Note that it is also possible to provide the AC adapter 10a connected to the AC power source 10 and the rectifier circuit 11 outside the power feeding stand 27.

The electric pot 28 is used for housing water or other contents 36 inside for heating the water or other contents 36. In the electric pot 28, an electric pot body 37 is engaged airtightly with an exterior material 40 located at the bottom via a packing 41. The electric pot body 37 is formed by a double wall including an inner wall portion 38a and an outer wall portion 38b. An inside of the electric pot body 37 functions as a vacuum heat insulating portion 39. The electric pot body 37 is covered with a lid 42. A substrate holder 45 is provided between a bottom portion 44 of the exterior material 40 and the bottom portion of the electric pot body 37. A wiring board 47 is arranged between the substrate holder 45 and a substrate holder cover 46 located below the substrate holder 45. The power reception coil 14 is mounted between the lower surface of the substrate holder cover 46 and the bottom portion 44.

A vibration motor 43 is provided on a side part of the substrate holder 45. The heater 18 such as a ceramic heater supported by an inner bottom cover 50 is provided in close contact with the outer surface of the bottom portion of the electric pot body 37. A temperature sensor 22 is provided in close contact with the lower surface of the heater 18. The heater 18 is pressed against the bottom portion of the electric pot body 37 by a spring plate 48 provided between the substrate holder 45 and the inner bottom cover 50. In the heater 18, a thin film-shaped heater pattern is formed on a ceramic thin plate in a meandering manner. A thin thermistor is provided on the center of the heater pattern.

A circuit element and other circuits including a controller 20 achieved by a microcomputer are provided on the wiring board 47 as shown in FIG. 2. More in detail, the wiring board 47 is composed of a resonance capacitor 15 connected to the power reception coil 14 for conducting electricity by the effect of magnetic field resonance, a rectifier circuit 16 for rectifying the high-frequency electricity received by the power reception coil 14, a smoothing capacitor 17 and a power supply circuit 19 formed by a switch circuit such as MOS-FET. In addition, a temperature storage unit 25 configured to store the temperature detected by the temperature sensor 22, a temperature estimation unit 26 configured to estimate the temperature of the content 36, a non-volatile memory 23 configured to store the current set temperature of the electric pot 28, a gyro sensor 21 provided on an approximately center of the wiring board 47 for detecting the angular speed of the electric pot 28 and setting the temperature of the content 36, a temperature setting unit 24 configured to store the set temperature of the content 36 and a wireless communication unit 9 are connected to the controller 20. Furthermore, the vibration motor 43 is connected to the controller 20. A temperature estimation coefficient storage unit 29 is connected to the temperature estimation unit 26 for storing the temperature estimation coefficient Ce which is preliminarily specified based on the thermal resistance of the container forming the electric pot 28, the material of the container, the heat retaining performance of the container, the capacity of the container and the like.

The temperature estimation unit 26 is composed of a first subtraction circuit 30 configured to subtract the temperature Tn (temperature obtained the later described Step a8) which is inputted to a second temperature signal input terminal 34 from the temperature To (temperature obtained the later described Step a5) which is outputted from the temperature storage unit 25 and inputted to a first temperature signal input terminal 33, a division circuit 31 configured to obtain (To−Tn)/Ce by dividing (To−Tn) which is outputted from the first subtraction circuit 30 by the preliminarily specified temperature estimation coefficient Ce and a second subtraction circuit 32 configured to obtain the estimated temperature Te=To−(To−Tn)/Ce of the content 36 by subtracting (To−Tn)/Ce outputted from the division circuit 31 from the temperature To outputted from the temperature storage unit 25 and inputted to the first temperature signal input terminal 33.

Figure 6:
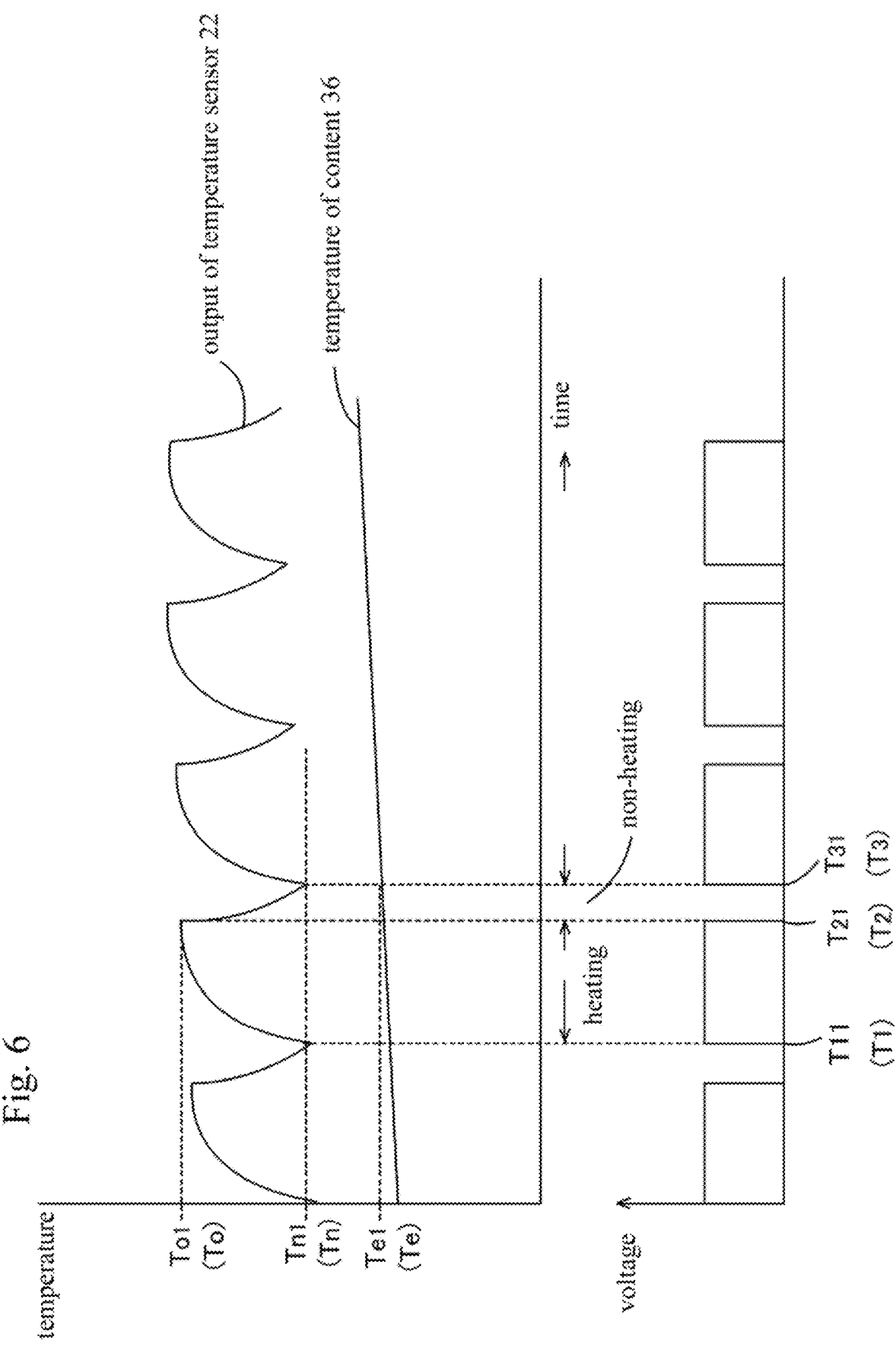
FIG. 6 is a drawing showing an operating waveform in the method and the device for estimating the temperature of the content in the electric pot of the present invention.
Figure 7:
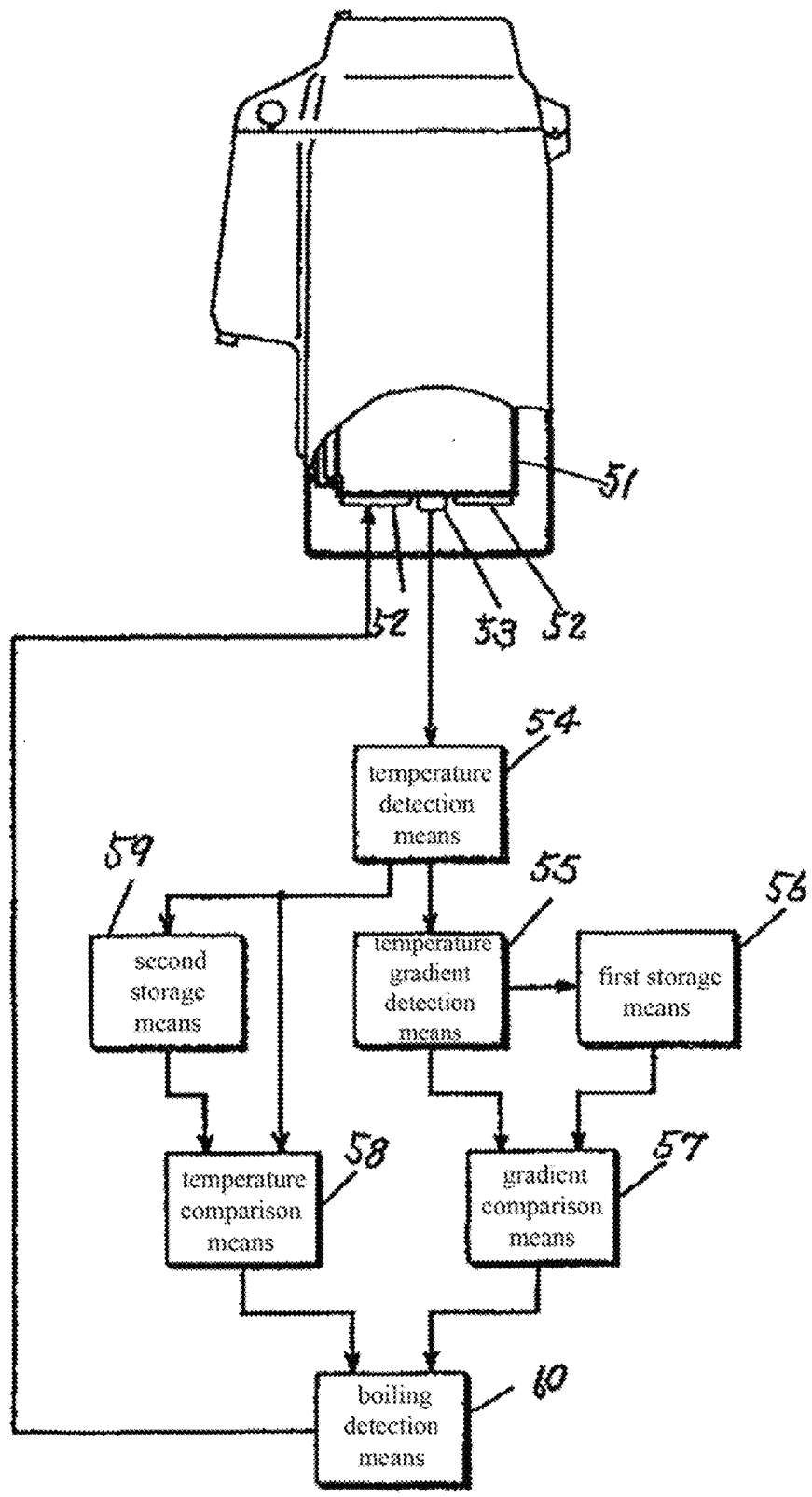
FIG. 7 is an explanation drawing of the conventional electric pot.

Note that the temperatures To, Tn are the temperatures detected by applying a pulse voltage to the heater 18 by repeatedly turning on the power between the time T1 and the time T2 and turning off the power between the time T2 and the time T3 for obtaining the estimated temperature Te of the content 36 in FIG. 6. The temperature To is the temperature obtained in the later described Step a5 while the temperature Tn is the temperature obtained in the later described Step a8.

Figure 4:
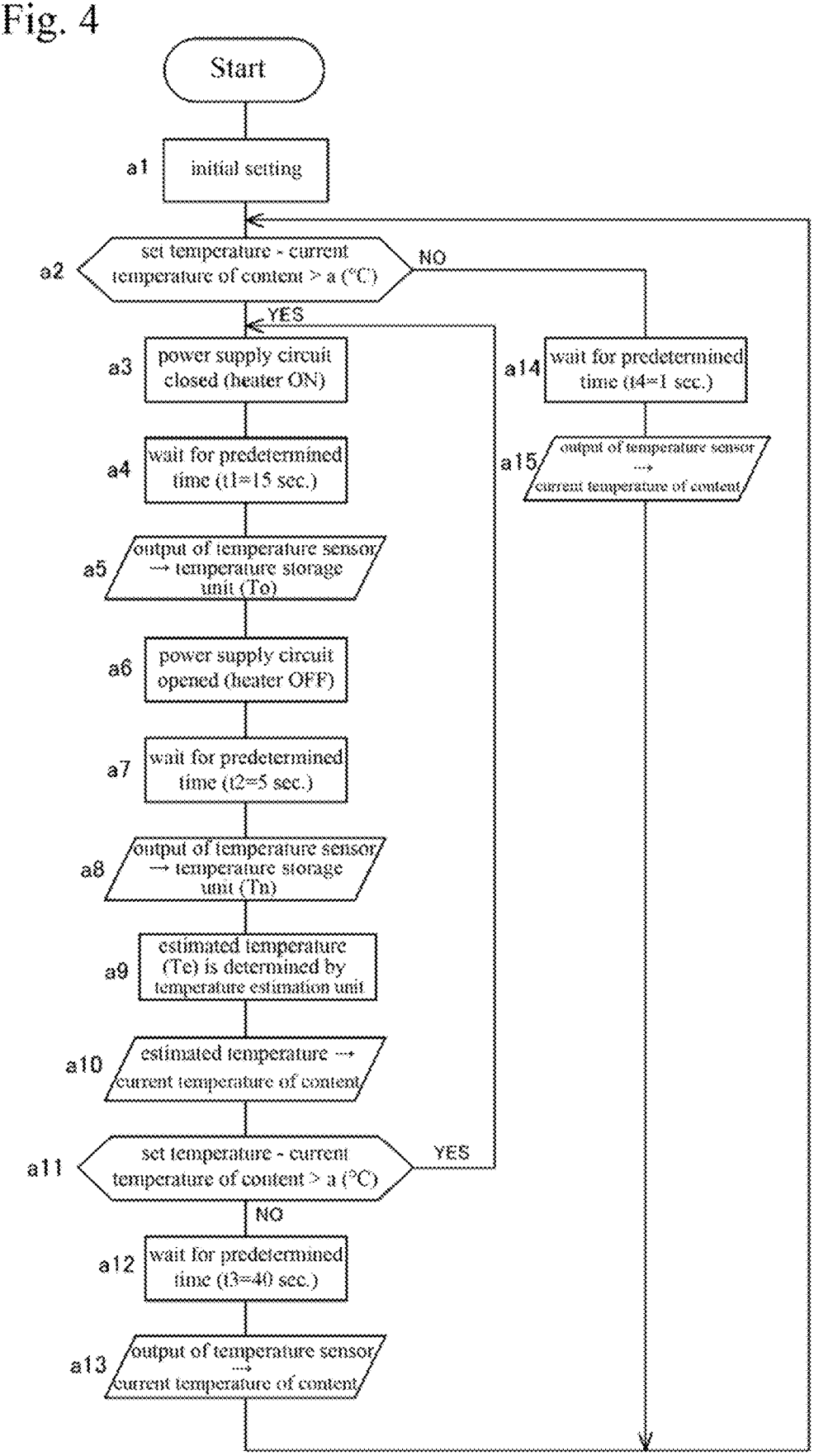
FIG. 4 is a flowchart of the method and the device for estimating the temperature of the content in the electric pot of the present invention.

In the above described configurations, the processes of heating the content 36 will be explained based on FIG. 4.

a1: When the electric pot 28 is placed on the center position of the power feeding stand 27, the temperature setting unit 24 is initialized to the set temperature immediately before the electric pot 28 is detached from the power feeding stand 27 based on the data stored in the non-volatile memory 23 via the controller 20. Suppose that the set temperature is initialized to 55° C., for example. At this time, the content 36 and the heater 18 are regarded to be in a temperature equilibrium state. Thus, the temperature of the heater 18 is measured by the temperature sensor 22 and the measured temperature is regarded as the current temperature of the content 36. Suppose that the current temperature is 50° C., for example.

a2: At this time, when the value subtracting the current temperature of the content 36 from the set temperature is larger than a° C. (e.g., a=0.5° C.), the determination in Step a2 is YES.

a3: The controller 20 closes the power supply circuit 19 and supplies the electricity to the heater 18 to heat the content.

a4: The above described state is kept for t1 seconds (e.g., t1=15 seconds).

a5: The temperature of the heater 18 is detected by the temperature sensor 22 and the detected temperature is stored as the temperature To in the temperature storage unit 25 via the controller 20.

a6: The power supply circuit 19 is opened for stopping the heating of the heater 18.

a7: The above described state is kept for t2 seconds (e.g., t2=5 seconds).

a8: The temperature of the heater 18 is detected by the temperature sensor 22 and the detected temperature is stored as the temperature Tn in the temperature storage unit 25 via the controller 20.

a9: The estimated temperature Te is determined by the temperature estimation unit 26. The details will be explained later.

a10: The estimated temperature Te is regarded as the current temperature of the content 36.

a11: When the value subtracting the current temperature of the content 36 from the set temperature is more than a° C. (YES in a11), the process is returned to the initial process of a3.

a12: When the value subtracting the current temperature of the content 36 from the set temperature is less than a° C. (NO in a11) in Step a11, the above described state is kept for t3 seconds (e.g. t3=40 seconds). The above described process is the process of waiting the temperature equilibrium state between the heater 18 and the content 36.

a13: The temperature of the heater 18 is detected by the temperature sensor 22 and the detected temperature is regarded as the current temperature of the content 36 and the process is returned to the above described Step a2.

a14: When the value subtracting the current temperature of the content 36 from the set temperature is less than a° C. (No in a2), the above described state is kept for t4 seconds (e.g. t4=1 second).

a15: The temperature of the heater 18 is detected by the temperature sensor 22 and the detected temperature is regarded as the current temperature of the content 36 and the process is returned to the above described Step a2.

Figure 5:
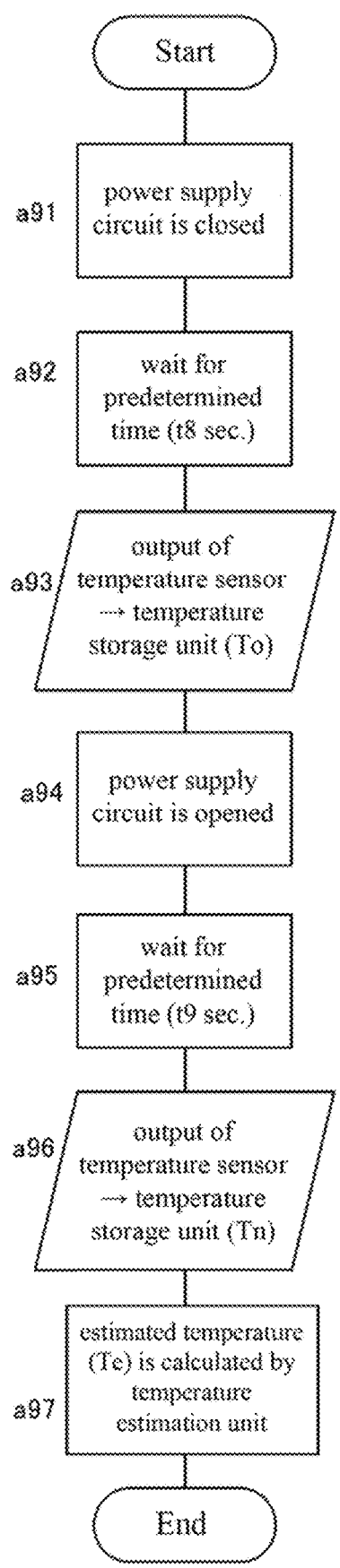
FIG. 5 is a flowchart of the method and the device for estimating the temperature of the content in the electric pot of the present invention when estimating liquid temperature.

The detailed process of calculating the estimated temperature Te by the temperature estimation unit 26 in the above described Step a9 will be explained based on FIG. 5 and FIG. 6.

The above described process is the process of estimating the temperature of the content 36 heated by the electric pot 28 using the detected value of the temperature sensor 22 provided on the outer surface of the bottom portion of the electric pot body 37 and the temperature estimation coefficient Ce peculiarly set to the electric pot 28 without using the temperature sensor directly measuring the temperature of the content 36.

In order to achieve the above described process, it is required to preliminarily determining the temperature estimation coefficient Ce peculiar to the electric pot 28 when developing the electric pot 28 shown in FIG. 1. The correlation between the heating of the content 36 in the electric pot 28 and the temperature of the content 36 varies depending on the electricity supplied to the heater 18, the thermal resistance between the heater 18 and the electric pot 28, the material of the electric pot 28, the heat retaining performance of the electric pot 28, the capacity of the electric pot 28 and the like. Thus, the temperature estimation coefficient Ce peculiar to the electric pot 28 is preliminarily specified in the following steps.

In FIG. 6, the power supply circuit 19 is closed at the time T11 and the heater 18 is energized and heated between the time T11 and the time 21 (e.g., for 15 seconds). The temperature To1 of the heater 18 at that time is detected by the temperature sensor 22 and stored.

Then, the energization to the heater 18 is stopped and not heated between the time T21 and the time T31 (e.g., for 5 seconds). The temperature Tn1 of the heater 18 at that time is detected by the temperature sensor 22 and stored.

At the same time, the actual temperature of the content 36 at the time T31 is measured by a not-illustrated another temperature sensor.

The temperature of the content 36 at that time is stored. When developing the electric pot 28, the value satisfying the following formula is preliminarily determined based on the above described values of To1, Tn1 and Te1 as the temperature estimation coefficient Ce peculiar to the electric pot 28.

$$Ce=(To1-Tn1)/(To1-Te1)$$

Incidentally, 0.57 was obtained as the specific example of the temperature estimation coefficient Ce.

Figure 3:
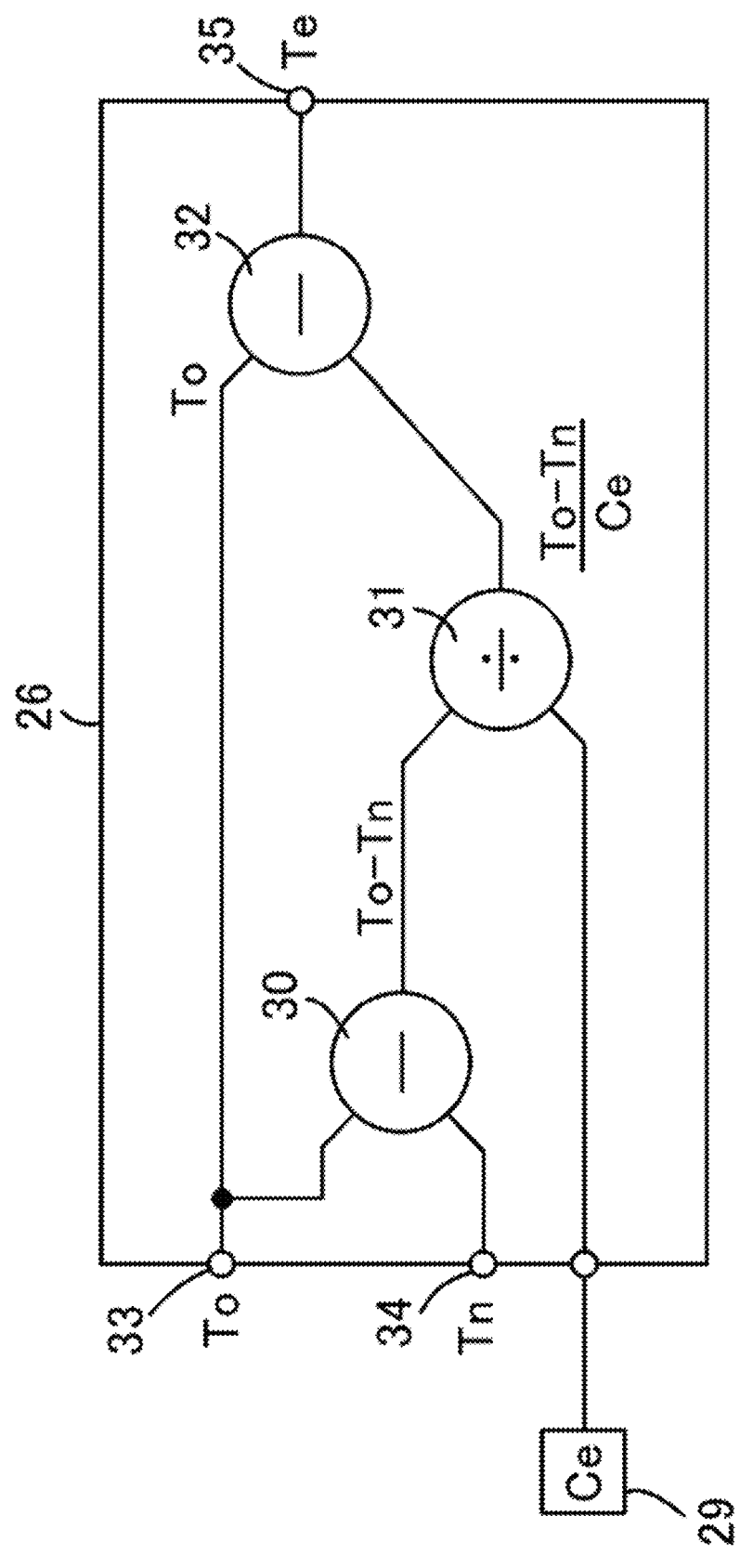
FIG. 3 is a block diagram of a temperature estimation unit 26 of FIG. 2.

The process will be explained in detail using FIG. 5.

a91: The power supply circuit 19 is closed at the time T1 shown in FIG. 6. The above described Step a3 corresponds to this process.

a92: The heater 18 is heated for a predetermined time period (t8 seconds) (between T1 and T2, e.g., 15 seconds). The above described Step a4 corresponds to this process.

a93: The temperature To of the heater 18 at the time To is detected by the temperature sensor 22 and To is stored in the temperature storage unit 25 via the controller 20. The above described Step a5 corresponds to this process.

a94: The power supply circuit 19 is opened at the time of T2 to stop the heating of the heater 18. The above described Step a6 corresponds to this process.

a95: The heating is stopped for a predetermined time period (t9 seconds) (between T2 and T3, e.g., 5 seconds). The above described Step a7 corresponds to this process.

a96: The temperature Tn of the heater 18 at the time T3 is detected by the temperature sensor 22 and Tn is stored in the temperature storage unit 25 via the controller 20. The above described Step a8 corresponds to this process.

a97: The estimated temperature Te is calculated by the temperature estimation unit 26 based on To and Tn inputted from the temperature storage unit 25 to the temperature estimation unit 26 and Ce inputted from the temperature estimation coefficient storage unit 29. The above described Step a9 corresponds to this process. In the calculation of Te calculated by the temperature estimation unit 26, as shown in FIG. 3, (To−Tn) is obtained by subtracting Tn inputted from the temperature storage unit 25 to a second temperature signal input terminal 34 from To inputted from the temperature storage unit 25 to a first temperature signal input terminal 33 by the first subtraction circuit 30. In the division circuit 31, (To−Tn)/Ce is obtained by dividing (To−Tn) obtained by the first subtraction circuit 30 by Ce preliminarily stored in the temperature estimation coefficient storage unit 29. In the second subtraction circuit 32, (To−Tn)/Ce obtained by the division circuit 31 is subtracted from To inputted to the first temperature signal input terminal 33. As a result, Te is obtained by the following formula in an output terminal 35.

$$Te=To-(To-Tn)/Ce$$

The temperature of the content 36 obtained in the above described processes is used as the current temperature in the temperature control. In addition, the obtained temperature is transmitted from the wireless communication unit 9 to a wireless terminal 8 via the controller 20 and displayed on a display 7 provided on the wireless terminal 8.

When the electric pot 28 is placed on the center position of the power feeding stand 27, the temperature setting unit 24 is initialized to the set temperature immediately before the electric pot 28 is detached from the power feeding stand 27 based on the data stored in the non-volatile memory 23 via the controller 20.

When increasing the set temperature of the temperature setting unit 24, the electric pot 28 is rotated by a predetermined angle in a clockwise direction by hands. Consequently, the gyro sensor 21 detects the angular speed of the electric pot 28 and outputs the angular speed to the controller 20. The controller 20 raises the set temperature of the temperature setting unit 24 by 1° C. as the center angle varies 20°, for example. Then, the controller 20 stores the set temperature of the temperature setting unit 24 in the non-volatile memory 23.

The temperature of the content 36 is raised to the target temperature by repeating the above described processes using the set temperature of the temperature setting unit 24.

When decreasing the temperature setting unit 24, the electric pot 28 is rotated by a predetermined angle in a counter-clockwise direction by hands. Consequently, the gyro sensor 21 detects the angular speed of the electric pot 28 and outputs the angular speed to the controller 20. The controller 20 lowers the set temperature of the temperature setting unit 24 by 1° C. as the center angle varies 20°, for example. Then, the controller 20 stores the set temperature of the temperature setting unit 24 in the non-volatile memory 23.

The temperature of the content 36 is lowered to the target temperature by repeating the above described processes using the set temperature of the temperature setting unit 24.

In FIG. 1, it is possible to incorporate the vibration motor 43 in the substrate holder 45 inside the electric pot 28 so that the electric pot 28 is vibrated for notifying the user in the cases shown in the following Table 1.

TABLE 1

| condition for vibration | vibration pattern | relation to gyro sensor 21 |
|---|---|---|
| when the electric pot 28 is placed on the power feeding stand 27 | 600 ms, 1 time | |
| when the set temperature reaches the lower limit value | 200 ms, 1 time | ○ |
| when the set temperature reaches the upper limit value | 200 ms, 1 time | ○ |
| when setting temperature varies by every 10° C. | 200 ms, 1 time | ○ |
| when the temperature of the content 36 reaches the set temperature | 200 ms ON, 200 ms OFF, 3 times | |
| when searching the device | 300 ms ON, 300 ms OFF, 3 times | |
| when abnormality occurs | 200 ms, every 1 second, continuously | |

LIST OF REFERENCE NUMERALS

7: display, 8: wireless terminal, 9: wireless communication unit, 10: AC power source, 11: rectifier circuit, 12: inverter circuit, 13: power supply coil, 14: power reception coil, 15: resonance capacitor, 16: rectifier circuit, 17: smoothing capacitor, 18: heater, 19: power supply circuit, 20: controller, 21: gyro sensor, 22: temperature sensor, 23: non-volatile memory, 24: temperature setting unit, 25: temperature storage unit, 26: temperature estimation unit, 27: power feeding stand, 28: electric pot, 29: temperature estimation coefficient storage unit, 30: first subtraction circuit, 31: division circuit, 32: second subtraction circuit, 33: first temperature signal input terminal, 34: second temperature signal input terminal, 35: output terminal, 36: content, 37: electric pot body, 38*a*: inner wall portion, 38*b*: outer wall portion, 39: vacuum heat insulating portion, 40: exterior material, 41: packing, 42: lid, 43: vibration motor, 44: bottom portion, 45: substrate holder, 46: substrate holder cover, 47: wiring board, 48: spring plate, 49: mica plate, 50: inner bottom cover, 51: container, 52: heater, 53: thermosensitive element, 54: temperature detection means, 55: temperature gradient detection means, 56: first storage means, 57: gradient comparison means, 58: temperature comparison means, 59: second storage means, 60: boiling detection means

The invention claimed is:

1. A device of estimating a temperature of a content in an electric pot for heating the content by a heater provided with the electric pot, the device comprising:
a power feeding stand incorporating a power supply coil;
the electric pot incorporating a power reception coil configured to receive an electricity from the power supply coil in a non-contact manner;
a power supply circuit configured to supply the electricity to the heater;
a temperature sensor configured to detect the temperature of the heater;
a controller connected to the power supply circuit for controlling an energization to the heater;
a temperature storage unit connected to the controller for storing the temperature detected by the temperature sensor via the controller;
a temperature estimation coefficient storage unit configured to store a temperature estimation coefficient Ce preliminarily and peculiarly set to the electric pot; and
a temperature estimation unit configured to estimate the temperature of the content based on a data stored in the temperature storage unit and the temperature estimation coefficient Ce.

2. The device of estimating the temperature of the content in the electric pot according to claim 1, wherein the temperature estimation coefficient Ce is determined by the following formula:

$$Ce=(To1-Tn1)/(To1-Te1),$$

the temperature To1 is the temperature at the time T21 and the temperature Tn1 is the temperature at the time T31, the temperature To1 and the temperature Tn1 are measured by controlling the power supply circuit in accordance with an instruction from the controller to apply a pulse voltage to the heater by repeatedly turning on the power supply circuit between the time T11 and the time T21 and turning off the power supply circuit between the time T21 and the time T31, the temperature To1 and the temperature Tn1 are stored in the temperature storage unit, and the temperature Te1 is the actually measured temperature of the content preliminarily measured by another temperature sensor different from the temperature sensor at the time T31.

3. The device of estimating the temperature of the content in the electric pot according to claim 2, wherein the temperature Te which is an estimated temperature of the content is determined by the following formula:

$$Te=To-(To-Tn)/Ce,$$

the temperature To and the temperature Tn are measured by controlling the power supply circuit in accordance with an instruction from the controller to apply a pulse voltage to the heater by repeatedly turning on the power supply circuit between the time T1 and the time T2 and turning off the power supply circuit between the time T2 and the time T3, and the temperature To and the temperature Tn are stored in the temperature storage unit.

4. The device of estimating the temperature of the content in the electric pot according to claim 3, wherein
the temperature estimation unit comprising:
   a first subtraction circuit configured to subtract the temperature Tn from the temperature To which are outputted from the temperature storage unit;
   a division circuit configured to obtain $(To-Tn)/Ce$ by dividing $(To-Tn)$ which is outputted from the first subtraction circuit by the temperature estimation coefficient Ce; and
   a second subtraction circuit configured to obtain the estimated temperature $Te=To-(To-Tn)/Ce$ of the content by subtracting $(To-Tn)/Ce$ outputted from the division circuit from the temperature To outputted from the temperature storage unit.

5. The device of estimating the temperature of the content in the electric pot according to claim 1, wherein
   the device further comprising: a gyro sensor provided in an appropriately rotation center position of the electric pot for outputting a rotation angle and a rotation direction of the electric pot,
   the gyro sensor is connected to the controller,
   the temperature determined by an output of the gyro sensor is stored in a temperature setting unit, and
   the controller is configured to control the electricity supplied from the power supply circuit so that the temperature of the content is matched with the temperature stored in the temperature setting unit.

6. The device of estimating the temperature of the content in the electric pot according to claim 1, wherein
   the device further comprising: a gyro sensor provided in an appropriately rotation center position of the electric pot for outputting a rotation angle and a rotation direction of the electric pot,
   the gyro sensor is connected to the controller,
   the temperature determined by an output of the gyro sensor is stored in a temperature setting unit,
   the controller is configured to control the electricity supplied by the power supply circuit so that the temperature of the content is matched with the temperature stored in the temperature setting unit,
   a vibration motor is provided inside the electric pot,
   the vibration motor is connected to the controller, and
   when the temperature determined by the output of the gyro sensor reaches a predetermined value, the vibration motor is driven by a signal of the controller to vibrate the electric pot for notification.

7. A method for estimating a temperature of a content in an electric pot for heating the content by a heater provided with the electric pot using a device comprising:
   a power feeding stand incorporating a power supply coil;
   the electric pot incorporating a power reception coil configured to receive an electricity from the power supply coil in a non-contact manner;
   a power supply circuit configured to supply the electricity to the heater;
   a temperature sensor configured to detect the temperature of the heater;
   a controller connected to the power supply circuit for controlling an energization to the heater;
   a temperature storage unit connected to the controller for storing the temperature detected by the temperature sensor via the controller;
   a temperature estimation coefficient storage unit configured to store a temperature estimation coefficient Ce preliminarily and peculiarly set to the electric pot; and
   a temperature estimation unit configured to estimate the temperature of the content based on a data stored in the temperature storage unit and the temperature estimation coefficient Ce,
the method comprising:
   a step of controlling the power supply circuit in accordance with an instruction from the controller to apply a pulse voltage to the heater by repeatedly turning on the power supply circuit between the time T11 and the time T21 and turning off the power supply circuit between the time T21 and the time T31;
   a step of determining the temperature To1 at the time T21 and the temperature Tn1 at the time T31 by the temperature sensor;
   a step of determining the actually measured temperature Te1 of the content preliminarily measured by another temperature sensor different from the temperature sensor at the time T31;
   a step of determining the temperature estimation coefficient Ce peculiarly set to the electric pot by the following formula:
   $Ce=(To1-Tn1)/(To1-Te1);$
   a step of controlling the power supply circuit in accordance with the instruction from the controller to apply a pulse voltage to the heater by repeatedly turning on the power supply circuit between the time T1 and the time T2 and turning off the power supply circuit between the time T2 and the time T3;
   a step of storing the temperature To at the time T2 and the temperature Tn at the time T3 measured by the temperature sensor in the temperature storage unit; and
   a step of determining the temperature Te of the content based on the preliminarily set temperature estimation coefficient Ce, the temperature To and the temperature Tn by the following formula:
   $Te=To-(To-Tn)/Ce.$

* * * * *